MARKO SFILIGOJ AND CARL F. SWINEHART, INVENTORS

United States Patent Office 3,282,641
Patented Nov. 1, 1966

3,282,641
SCAVENGER AND PROCESS FOR PURIFICATION OF METAL FLUORIDES
Marko Sfiligoj, South Euclid, and Carl F. Swinehart, University Heights, Ohio, assignors to The Harshaw Chemical Company, Cleveland, Ohio, a corporation of Ohio
Filed Oct. 9, 1963, Ser. No. 314,953
6 Claims. (Cl. 23—88)

This invention relates generally to a method of obtaining an optical body substantially free of color, and more particularly the invention relates to the production of color-free optical bodies of magnesium fluoride, alkaline earth metal fluorides and rare earth metal fluorides.

The invention further relates to the production of color-free optical bodies of perfect transparency, particularly from a melt of a member of the group consisting of magnesium fluoride, alkaline earth metal fluorides, and rare earth metal fluorides which have been produced synthetically.

Frequently, large bodies or crystals grown from melts of one of the above fluorides are colored—they absorb light of various wave lengths. Characteristically, each metal fluoride invariably has a significant absorption spectrum thus preventing the crystalline bodies of the fluoride from being used for many optical applications. The reasons for this presence of color in the optical bodies are not understood, but it is thought that the color is caused by the presence of trace amounts of impurities.

The optical bodies of the fluorides are produced by any one of the conventional crystal-growing procedures. Broadly, the optical crystalline bodies are prepared by removing the heat of fusion through the continually-forming solid material while supplying heat to the melt. Particular crystal-growing procedures are taught by Stockbarger (U.S. Patent 2,149,076) and Kyropoulos [Z. Phys. Chem. 92, 219 (1917)]. Generally these procedures involve heating and fusing the fluoride salt or salts in a first zone maintained at a temperature above the fusion point of the melt and slowly moving the melt into a second zone maintained at a cooler temperature across a sharp temperature gradient. Usually an incipient crystal growth is developed at the point of the lowest temperature of the melt and the melt with the incipient crystal growth is moved slowly into the second zone across a sharp temperature gradient.

The present invention is based on the discovery that color-free crystalline bodies of the above-mentioned fluorides may be reproduced consistently if the vapor phase above the melt is contacted with a scavenger compound selected from the group consisting of manganese trifluoride, cobalt trifluoride and mixtures thereof.

The invention conveniently is carried into effect by containing the scavenger compound within the crucible containing the metal fluoride charge in gaseous communication with the metal fluoride. The scavenger is kept from being in solid or liquid physical contact with the metal fluoride. This is accomplished by providing an aperture or vented cup for the scavenger positioned above the metal fluoride charge. As the crucible is heated to form the melt, the scavenger material starts to vaporize, passes through the vent in the cup and comes into contact with the charge. If the amount of scavenger is large enough, there will be a continuous transfer of the vaporized scavenger to the vapor phase above the melt during the entire time of growing the crystalline body. Other schemes or arrangements to bring the vaporized scavenger with the vapor above the melt may be used also. The entire furnace may be filled with vaporized scavenger or the vaporized scavenger may be channeled from a source outside the furnace or crucible to the inside of the crucible. In a Kyropoulos type furnace where the melt surface is extensively exposed, the scavenger vapors of the present invention cooperate with an inert gas to aid in reducing evaporation of the melt.

The scavengers of the present invention also may be used advantageously with the method of purifying optical metal fluoride bodies such as is disclosed and claimed in U.S. Patent 2,498,186. The method disclosed therein includes the additions of lead fluoride directly to the charge. Optical bodies having excellent transparency to light may be obtained using the procedure outlined in the above patent. However, the ingots of the crystalline metal fluoride grown according to the procedure outlined in this patent usually are produced with substantial portions (at least about 20 percent of the ingot) having optical defects. Uniformly the top layer of the ingot contains light-scattering flaws and light-absorbing centers manifested as hair-like vertical striations, bubbles, sparkles, color and the like.

Moreover, the use of lead fluoride alone as the scavenger has never been entirely successful when used with synthetic metal fluorides, those metal fluorides produced from reacting chemically other compounds rather than the naturally occurring mineral or scrap materials from a previous melt.

Additionally, it is commonly understood by those skilled in the art that good optical crystalline bodies of metal fluorides cannot be prepared directly from the synthetically produced fluorides. It is not known or believed that optical bodies having acceptable transparency have ever been prepared prior to the present invention from synthetically produced fluorides when used initially as the charge. It is thought that sulfides, sulfates, oxides of silica and the like are responsible for some of the flaws occurring in the crystalline lattice but it is almost certain that the main contaminant is obtained from the combined oxygen formed from residual water. When precipitating the synthetically formed alkaline earth metal fluoride, rare earth metal fluoride or magnesium fluoride, more water producing more oxide is present usually than would be present in the naturally occurring fluorspar or remelted fluoride scrap.

It has now been discovered that substantially all of these deficiencies of the lead fluoride as a scavenger can be overcome by using the lead fluoride in conjunction with the scavengers (manganese trifluoride, cobalt trifluoride) of the present invention in the manner described; the lead fluoride is incorporated as one of the constituents of the charge and a scavenger of the present invention is allowed to contact only the vapor phase above the melt.

As hereinbefore indicated, the amount of the manganese trifluoride or cobalt trifluoride to be used depends on the time it takes to grow the metal fluoride body. Roughly, these scavengers may be used in amounts ranging from about 0.25 percent to about two percent by weight of the charge. However, excessive amounts are not harmful. If lead fluoride is to be incorporated in the melt in the manner disclosed and claimed in U.S. Patent 2,498,186, any proportion of the lead fluoride to the metal fluoride may be used; the amount is not critical because excess lead fluoride may be removed easily by volatilization. However, experience has shown that one to four percent by weight based on the total weight of the melt are usually sufficient.

As a further refinement of the present invention, it has been found advantageous to add small amounts of a lead oxide such as litharge (PbO) or red lead ($Pb_3O_4$) and lead metal to the metal fluoride charge along with the lead fluoride. This lead fluoride-lead oxide-lead metal scavenger system preferably comprises about 20 times as much lead fluoride as either the lead oxide or the lead metal. In place of the lead metal (Pb) it has been found advantageous to use vanadium metal in similar amounts. Where the charge of metal fluoride is large (e.g. 20 pounds) the lead fluoride and lead oxide are admixed with the charge and the lead metal is placed separately in a vented cup in a manner similar to the cup containing the scavengers of the present invention. Because of the volatilization of the lead compounds generally, almost any proportion may be used. When used with the scavengers of the present invention for the upgrading of a precipitated metal fluoride, extremely good results are obtained; ingots are obtained having 98 percent optically usable material and sometimes are obtained having over 99 percent optically usable material.

The reasons for the advantages obtained from these additions of the lead oxide and lead metal or vanadium metal with lead fluoride are not fully understood. However, it is thought that the lead oxide acts in the manner of a mass action stabilizer holding back the formation of oxide during the initial heating of the melt. When any water is present, a certain amount of hydrogen fluoride (HF) is formed leaving an oxide of the metal from the metal fluoride. The lead oxide tends to shift this reaction toward the formation of the metal fluoride. The lead metal appears to aid in the evaporation of residual amounts of the lead oxide. As indicated hereinbefore where the charge is large, the lead metal is employed as the vapor; it is channeled into contact with the melt as it vaporizes from a cup positioned above the melt.

It is apparent that the metal fluoride advantageously may be added directly to the crucible in any form inasmuch as the manganese trifluoride and/or the cobalt trifluoride needed to contact only the vapor phase above the melt to act to upgrade the body. Where a solid ingot is to be remelted, it is quite an advantage to be able to remelt the ingot as a single integral body rather than have to pulverize or otherwise comminute the ingot for blending with a scavenger such as lead fluoride. If, however, the lead fluoride scavenger is to be used in conjunction with the scavengers of the present invention, the metal fluoride must be in a pulverized or powdered state.

As previously indicated, the scavengers of the present invention are preferably incorporated in a vented cup positioned within the furnace for contacting the vapor phase of the melt. A preferred arrangement and design of the cup and its position within a crucible are illustrated in the accompanying drawings wherein.

Figure 1:
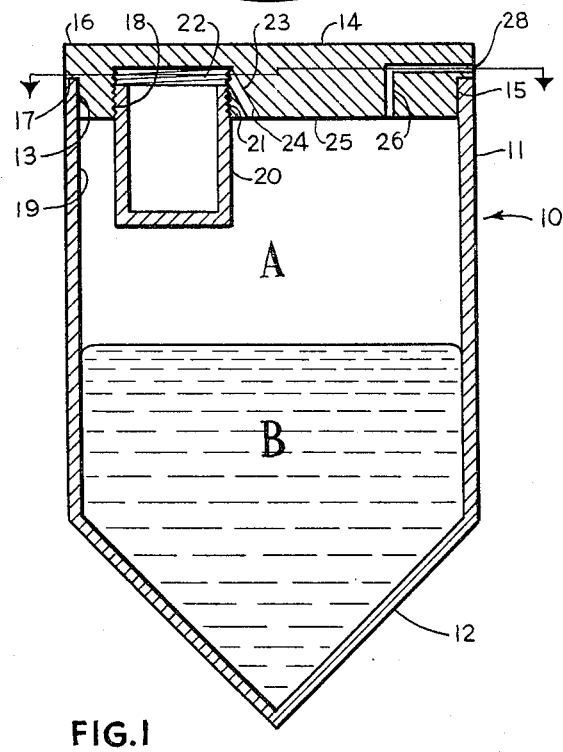
FIG. 1 is a side view in section of a crucible having a lid and cup affixed to the underside of the lid.

Referring to FIG. 1, there is shown a crucible 10 including a cylindrical side wall 11 and a conical bottom wall 12. Seated in the upper annular open end 13 of the crucible is a lid 14 having a cylindrical main body portion fitted snugly into the crucible and an outer annular portion 16 radially extending over and abutting against an annular face 17 at the upper end 13.

Figure 2:
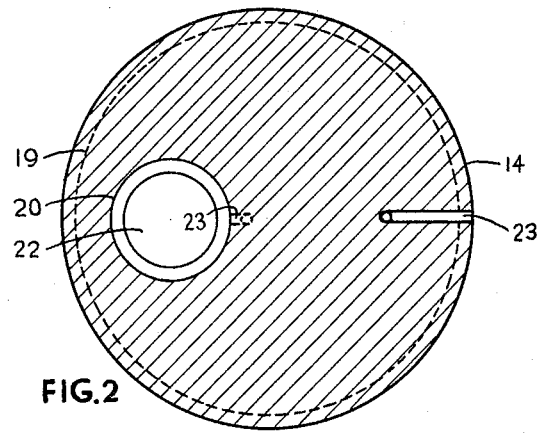
FIG. 2 is a sectional view taken on line 2—2 of FIG. 1.

Referring to FIG. 2 in conjunction with FIG. 1, there is shown the cylindrical portion 15 of the lid 14 provided with a tapped hole 18 preferably spaced from the center of the lid but not in contact with the inner wall 19 of the crucible. One or more small cups (one shown) provided with a threaded outer annular wall 21 is threadably mounted within the hole 18. At the upper portion of the hole 18a, zone 22 is provided above the cup 20 and is in gaseous communication with the upper zone A in the crucible by way of a small conduit or vent 23 terminating at an opening 24 in the bottom 25 of the lid 14. The upper zone A also is in gaseous communication with the exterior of the crucible by way of a vent 26 of minimum diameter commencing at the underside of the lid 14 and terminating at an opening 28.

In carrying out the method of the present invention, heat is applied to the crucible 10 to form a melt B producing a vapor phase in zone A. Simultaneously, a scavenger (not shown) in cup 20 starts vaporizing and passes through the vent 23 into the zone A contacting the charge through the vapor phase above the melt. Progressive solidification of the melt B is then carried out using one of the methods of growing crystals as above described. Continually during the progressive solidification of the melt the vaporized scavenger is being diffused into the vapor of the melt B in zone A.

In order that those skilled in the art may better understand how the present invention may be carried into effect, the following examples are given by way of illustration and not by way of limitation.

All parts and percentages are by weight unless otherwise specified.

Example I

A crucible and cup arrangement similar to that illustrated in the drawing is used. The metal fluoride to be upgraded consisting of calcium fluoride (selected color fluorspar), 450 parts, is charged into the crucible and the scavenger, manganese trifluoride, 1 (one) part, is contained in the cup mounted at the underside of the lid. After mounting the lid on the top of the crucible, the crucible and contents are placed in a Stockbarger type furnace. The furnace is then evacuated to a pressure of less than 0.1 mm. Hg absolute, and heat is applied over an 18-hour period until all gassing ceases and the charge fuses into a melt. After setting the temperature controls down to growth, the crucible is lowered slowly into a cooler zone at 4 mm. per hour and continued for 24 hours. The elevator is stopped and the temperature slowly brought to room temperature over a period of 24 hours. The entire ingot is color free.

Further examples of methods for purifying and upgrading fluoride salts according to the present invention, conducted in a manner similar to that described in Example I, are set forth in the following table:

| Ex. No. | Fluoride, Salt, Parts | Scavenger of the Present Invention, Parts | Lead Fluoride Scavenger, Parts | Lead Oxide (PbO)-Lead Metal Scavenger 1:1, Parts | Additional Fluoride Salts, Parts | Remarks |
|---|---|---|---|---|---|---|
| II | Calcium fluoride, 450 (selected color fluorspar) | Cobalt trifluoride, 2 | | | | |
| III | Calcium fluoride, 450 (precipitated calcium fluoride from calcium carbonate and hydrofluoric acid) | Manganese trifluoride, 1 | 10 | 1 | | 95 percent of the resulting ingot was free from optical defects. |
| IV | Barium fluoride, 450 (precipitated barium fluoride from barium carbonate and hydrofluoric acid) | ___do___ | 10 | 1 | | Do. |
| V | Barium fluoride, 450 (optical scrap).[1] | Manganese trifluoride, 2 | | | | |
| VI | Strontium fluoride, 450 (optical scrap).[1] | ___do___ | 10 | | | |
| VII | Magnesium fluoride, 450 (optical scrap).[1] | ___do___ | 10 | | | |
| VIII | Barium fluoride, 367 (optical scrap).[1] | ___do___ | 10 | | Calcium fluoride, 100 | |

| Ex. No. | Fluoride Salt, Parts | Scavenger of the Present Invention, Parts | Lead Fluoride Scavenger, Parts | Lead Oxide (PbO)-Lead Metal Scavenger 1:1, Parts | Additional Fluoride Salts, Parts | Remarks |
|---|---|---|---|---|---|---|
| IX | Calcium fluoride, 450 (optical scrap).[1] | Cobalt trifluoride, 2 | | | Europium fluoride, 0.45. | The resulting body is a europium activated scintillation phosphor. |
| X | Lanthanum fluoride, 450 (optical scrap).[1] | Manganese trifluoride, 2 | 10 | | | |
| XI | Calcium fluoride, 450 (precipitated calcium fluoride from calcium carbonate & hydrofluoric acid). | Cobalt trifluoride, 1 | 10 | | | 95 percent of resulting ingot is free from optical defects. |
| XII | Strontium fluoride, 450 (optical scrap).[1] | Manganese trifluoride, 2 | | | | |
| XIII | Magnesium fluoride, 450 (optical scrap).[1] | ...do... | | | | |
| XIV | Barium fluoride, 342 (optical scrap).[1] | ...do... | | | Calcium fluoride, 108. | |
| XV | Lanthanum fluoride, 450 (optical scrap).[1] | ...do... | | | | |

[1] The expression "optical scrap" means that the starting material (metal fluoride) had been grown previously as a crystalline material but was not free from optical defects.

The following examples set forth the use of vanadium metal advantageously with the scavengers of the present invention. These examples are also conducted in a manner similar to that described in Example I.

*Example XVI*

A charge consisting of calcium fluoride (crushed optical scrap) (450 parts), vanadium metal (0.8 part), and lead fluoride (10 parts) is charged as before into a crucible as before and manganese trifluoride (1 part) is placed in a cup at the underside of the lid. The crystal was grown as before under a pressure of 0.1 micron Hg absolute and a growth rate of 2.8 mm./hour.

The resulting ingot was optically clear, having no color or visible defects.

*Example XVII*

Example XVI was repeated using calcium fluoride (450 parts), europium fluoride (0.8 part), lead fluoride (10 parts) and vanadium metal (0.8 part) as the charge and manganese trifluoride (1.0 part) in the cup.

The resulting ingot comprised a crystal weighing 438 parts. The crystal had a strong fluorescence and gave a pulse height spectrum 13.4 percent of standard thallium activated sodium iodide for cesium[137].

All of the crystals produced according to the above examples (I–XV) are substantially water white, being free from color in the visible range.

The following examples are given by way of comparison.

*Example A*

When Example I is repeated using no scavenger, the resulting ingot is green in color thus indicating that the ingot contains certain light-absorbing impurities. The ingot prepared according to Example I is substantially color-free in the visible range, particularly at 2000 angstroms.

*Example B*

When Example V is repeated using no scavenger, the resulting ingot is blue in color thus indicating that the ingot contains certain light-absorbing impurities. The ingot prepared according to Example V is substantially color-free in the visible range.

*Example C*

When Example IV is repeated without a scavenger of the present invention, only 75 percent of the ingot is optically acceptable.

Other rare earth fluorides which may be used in preparation of optical bodies according to the present invention include the fluorides of europium, cerium, praseodymium, neodymium, promethium, samarium, gadolinium, terbium, dysprosium, holmium, erbium, thulium, ytterbium, and lutetium.

Sometimes the crystals produced using the natural occuring mineral (e.g. fluorspar) or the synthetically prepared starting material (e.g., the precipitated fluorides from the metal carbonate acetate or nitrate and hydrogen fluoride) contain some light-scattering flaws or inclusions. When this occurs, the ingot advantageously may be remelted and grown again with or without the use of lead fluoride to obtain a crystal having substantially perfect transparency.

If the scavengers of the present invention are used in conjunction with lead fluoride, a crystal ingot which is at least 95 percent optically acceptable is obtained consistently, particularly reducing absorbence near 2000 angstroms.

Optical bodies consisting of magnesium fluoride which are uniformly transparent to ultraviolet radiation may be prepared in any size. These bodies have a broad spectrum of light transmission, being transparent to ultraviolet radiation of wave lengths as short as 1130 angstroms or less. The same is true of barium and strontium fluorides which are especially transparent to infrared radiation. Radiation having wave lengths as long as 12 microns and 10.5 microns, respectively, is easily transmitted by these materials.

Barium fluoride optical elements of the present invention transmit ultraviolet radiation to 1350 angstroms and less wave lengths, while strontium fluoride elements transmit radiation to 1320 angstroms and less wave lengths. Calcium fluoride optical elements of the present invention transmit ultraviolet radiation to 1240 angstroms and less wave lengths and are transparent to infrared radiation of $9\mu$ and longer wave lengths. Magnesium fluoride optical elements of the present invention transmit ultraviolet radiation to 1130 angstroms and less wave lengths.

The crystals prepared according to the present invention may be used as (1) compensating elements for quartz lenses used with ultraviolet and visible light; (2) as windows for polarized light used in delineating grain in metalographed surfaces such as beryllium; (3) as windows for vacuum ultraviolet light particularly in the area of 2000 angtsroms where this light is to be detected; (4) as windows on liquid or gas cells in absorption spectroscopy of fluorides, oxyfluorides and the like, and (5) as prisms used for refracting. Moreover, the bodies prepared by the present invention having light-scattering flaws and inclusions but which are color-free have utility in many areas.

The crystalline mass produced according to Example VIII is not a single crystal. This crystalline mass is made up of two independent phases large enough to be seen. When cut and polished, they can be formed into optical bodies capable of effectively transmitting infrared radiation. See copending application Serial No. 314,952, filed October 9, 1963. Preferred optical bodies prepared according to the invention outlined in this application may be prepared using from about 10 percent to about 30 percent by weight calcium fluoride and from about 90 percent to about 70 percent by weight barium fluoride.

While specific examples of the invention have been set forth hereinabove, it is not intended that the invention be limited solely thereto, but to include all of the variations and modifications falling within the scope of the appended claims.

What is claimed is:

1. A method of preparing purified crystals from a member of the group consisting of alkaline earth metal, rare earth metal, and magnesium fluorides and mixtures thereof, initially containing a small amount of an impurity normally associated therewith, which comprises:

heating said member at reduced pressure to a temperature and for a period of time sufficient to provide a molten mass and an associated vapor phase formed from said member;

contacting said member in said vapor phase with a scavenger also in the vapor phase, said scavenger being selected from a group consisting of manganese trifluoride, cobalt trifluoride, and mixtures thereof;

slowly moving the molten mass at a controlled rate from a region hotter than its solidification temperature to a region cooler than said temperature and maintaining a temperature gradient between said regions near the boundary of said mass;

thereby crystallizing said member free from said impurity and in a substantially colorless condition.

2. The method of claim 1 characterized in that said member is heated at a normal pressure in the presence of an inert gas.

3. The method of claim 1 wherein said member is fluorspar.

4. The method of claim 1 wherein said member is a mixture of fluoride salts consisting of from about 10% to about 30% by weight of calcium fluoride and from about 90% to about 70% of barium fluoride.

5. The method of claim 1 in which lead fluoride is intimately admixed with said member prior to said heating step.

6. The method of claim 2 in which lead fluoride is intimately admixed with said member prior to said heating step.

References Cited by the Examiner
UNITED STATES PATENTS
2,498,186   2/1950   Stockbarger et al. _____ 23—88

OSCAR R. VERTIZ, *Primary Examiner.*

MAURICE A. BRINDISI, *Examiner.*

E. STERN, *Assistant Examiner.*